Feb. 7, 1950     S. E. HILBLOM     2,496,469
FRONT MOUNTED TRACTOR MOWER
Filed May 1, 1944     2 Sheets-Sheet 1
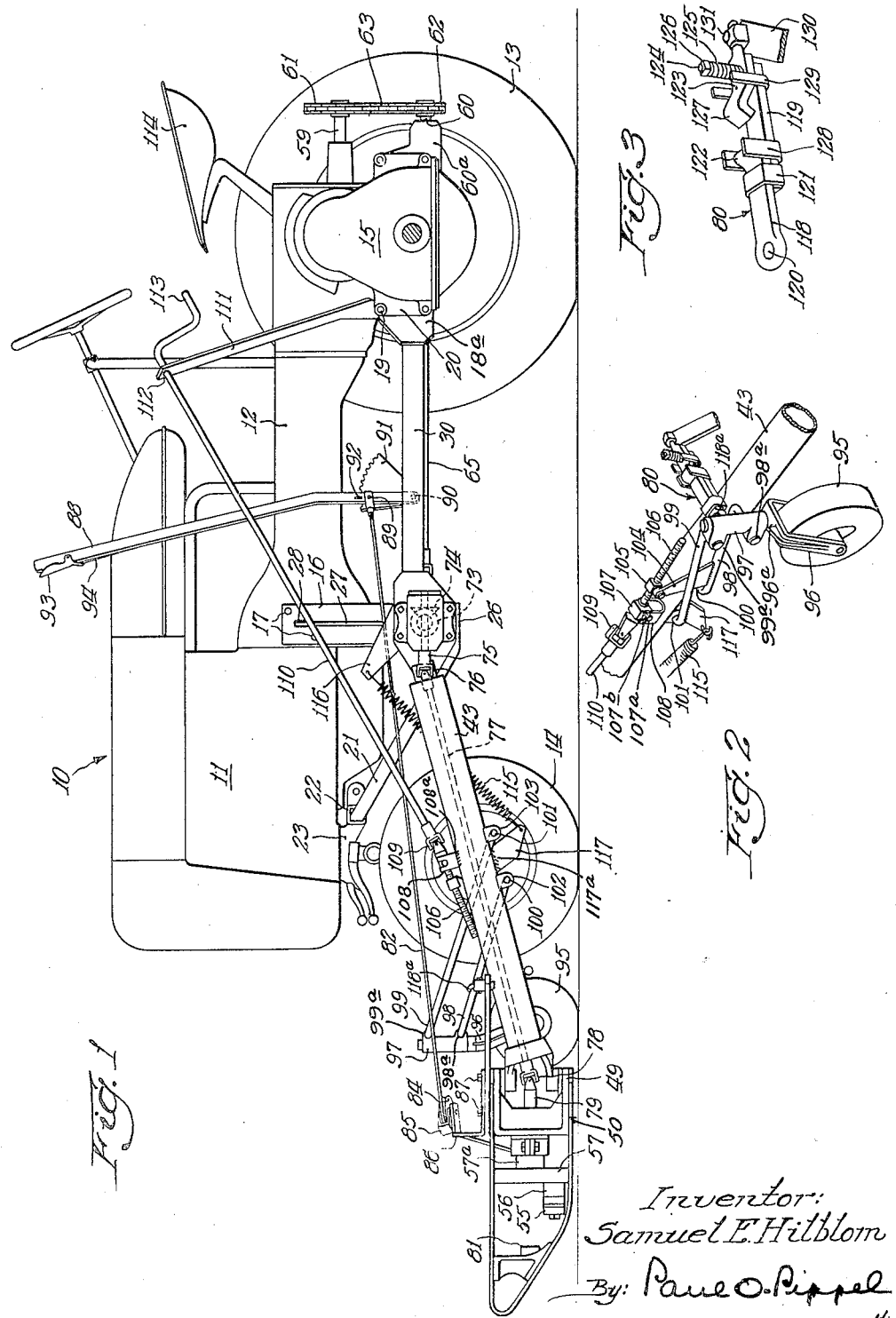
Inventor:
Samuel E. Hilblom
By: Paul O. Pippel
Atty

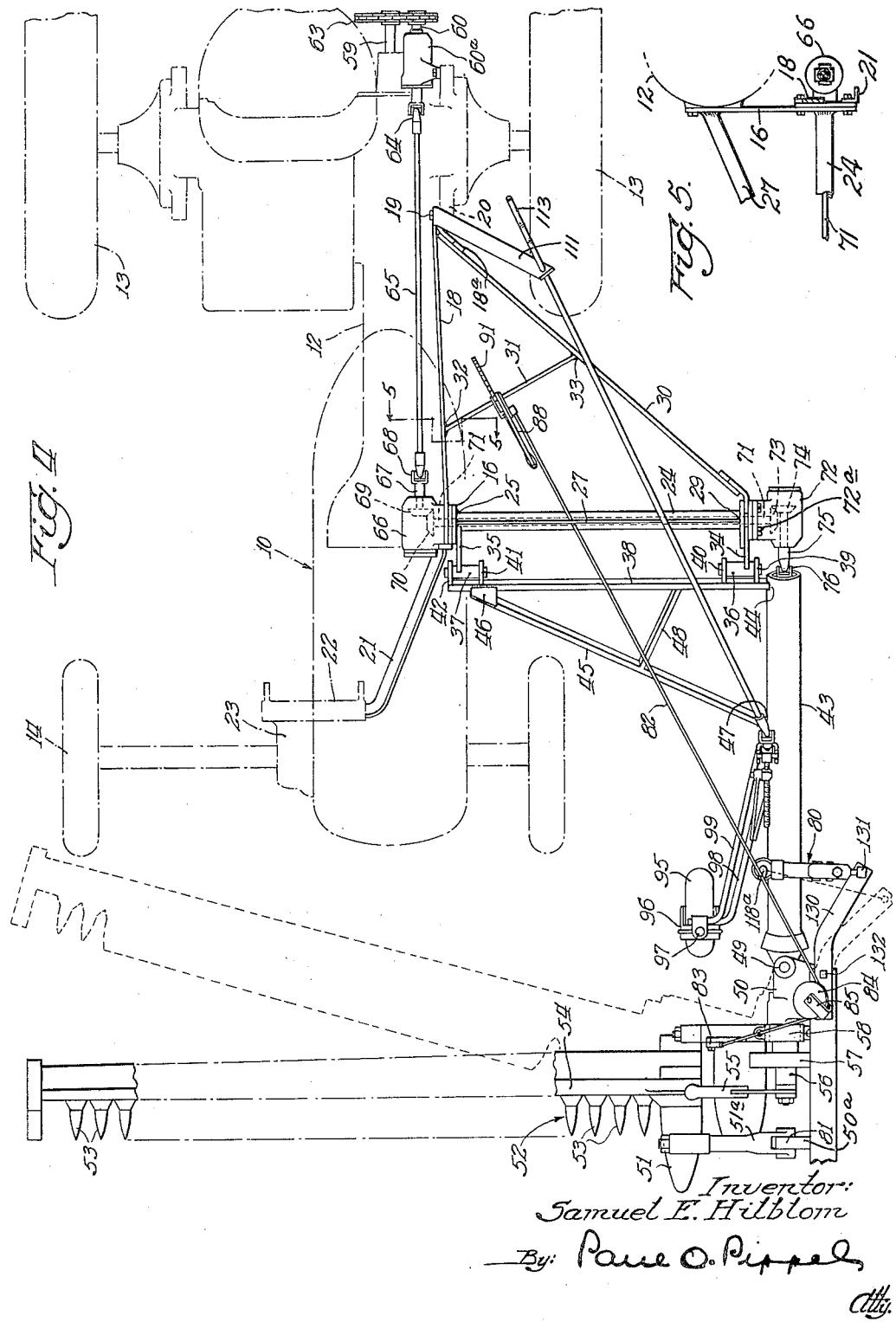

Patented Feb. 7, 1950

2,496,469

UNITED STATES PATENT OFFICE 2,496,469

FRONT-MOUNTED TRACTOR MOWER

Samuel E. Hilblom, Chicago, Ill., assignor to International Harvester Company, a corporation of New Jersey Application May 1, 1944, Serial No. 533,471

11 Claims. (Cl. 56—25)

This invention relates to a new and improved front mounted tractor mower and has for one of its principal objects the provision of means for positioning a mower forwardly of and in alinement with a tractor.

An important object of this invention is to provide a means for driving a front mounted mower and further means for allowing the mower to release rearwardly upon striking an obstruction without affecting the driving means.

Another important object of this invention is the provision of an adjustable caster-wheel mounted intermediate the front of the tractor and the mower.

Another and still further important object of this invention is to provide a novel release mechanism to permit the mower to yield upon striking an obstruction and thereby prevent injury to the mower elements.

Other and further important objects of this invention will become apparent from the disclosure in the following specification and accompanying drawings, in which:

Figure 1 is a side elevation of the front mounted tractor mower of this invention;

Figure 2 is a perspective view of the casterwheel and releasable latch;

Figure 3 is a further perspective view detail of the releasable latch;

Figure 4 is a top plan view of the front mounted tractor mower; and,

Figure 5 is a sectional view taken on the line 5—5 of Figure 4.

As shown in the drawings:

Reference numeral 10 indicates generally an agricultural tractor having an engine 11, a narrow chassis or body 12 having an arched rear frame supported by traction wheels 13 and the forward load of the body is mounted on steerable wheels 14. The rear traction wheels 13 are mounted on stub axles in depending axle housings 15. A mower frame structure comprises a plurality of frame members attached at three different points on the tractor. A downwardly depending plate 16 is bolted or otherwise fastened as shown at 17 to the waist or body portion 12 of the tractor 10. A second frame member 18 is fastened through a plate 18ª by means of bolts, or the like, 19 to a lug 20 projecting forwardly from one of the depending axle housings 15. A third frame member 21 is mounted beneath the tractor at the forward end thereof within a square socket 22 supplied in a special steering wheel housing 23. The frame members 18 and 21 project forwardly and rearwardly respectively where they join with the centrally located plate member 16. A tubular member 24 extends laterally out from the tractor and is supported at its inner end by means of the three frame members 16, 18 and 21. The tube 24 is welded or otherwise fastened to the depending plate 16 at 25. The lower rearward end 26 of the rearwardly extending frame member 21 forms a support for this juncture of frame members. An inclined brace member 27 is welded or otherwise fastened at 28 near the upper end of the frame plate 16 and is welded to the outer end of the tube member 24 at 29 for rigidly supporting the tube 24. The outer end of the tube 24 is further supported by a frame member 30 which is welded or otherwise fastened to and extends forwardly and outwardly from the lug 20 on the depending axle housing 15 to insure rigid support of the tube 24 by fastening thereto. An additional brace member 31 joins the members 18 and 30 intermediate their ends by means of welds 32 and 33. It is apparent, therefore, that the frame structure just described is rigid with respect to the tractor and forms a sturdy mounting for the mower structure.

The laterally extending tube 24 is equipped with a spaced apart plate and bracket 34ª and 35 respectively. A bracket 34, alined with and similar to the bracket 35, is welded or otherwise attached to the plate 34ª. The plate and bracket 34ª and 35 are welded or otherwise attached to the tube 24 at its inner end and, hence, form a rigid part of the stationary frame structure. A secondary frame structure is hinged to the stationary frame structure about the forward ends of the brackets 34 and 35. Transverse hinge pins 36 and 37 are fastened to the forward ends of the brackets 34 and 35 in axial alinement. A frame member 38, parallel with the tube 24 and positioned forwardly of the tube, is equipped with rearwardly extending lugs 39, 40, 41, and 42. The lugs 39 and 40 are journally mounted on the hinge pin 36 and the lugs 41 and 42 are journally mounted on the hinge pin 37.

A push bar in the form of a tube 43 is inclined forwardly and downwardly and is welded or otherwise fastened to the outer end of the frame member 38 at 44. A brace member 45 is fastened at its inner end by a plate 46 to the frame member 38 and thereupon extends forwardly and outwardly where it is fastened at the point 47 intermediate the ends of the tube 43. Another brace member 48 extends across the frame members 38 and 45 so that the secondary hinged frame structure is substantially an A frame. The forward end of the tube 43 forms the rear part of a vertical hinge 49, the forward complementary portion of which is the mower outer shoe 50.

The mower, in addition to having the outer shoe 50, is equipped with a regular inner shoe 51 and a lateral extending cutter bar 52 disposed in advance of the tractor. The cutter bar 52 comprises a series of gathering points 53 and a reciprocating knife blade 54. The knife blade 54 is reciprocated in the usual manner by attachment to a pitman 55 which is in turn attached to a crank arm 56 of a fly-wheel 57. The flywheel is equipped with a hub 57a which is adapted to abut the part 58 of the outer shoe 50.

The drive for the fly-wheel 57 is taken from a tractor power take-off shaft 59 extending outwardly from the rear end of the tractor body 12. A drive shaft 60 is journaled within a housing 60a in the inner side of the depending axle housing 15, as shown in both of Figs. 1 and 4. Drive from the power take-off shaft 59 is imparted to the shaft 60 by means of sprockets 61 and 62 fastened to the ends of the shafts 59 and 60, respectively, and joined by a chain 63. As best shown in Fig. 4, the forward end of the shaft 60, projecting out from the housing 60a, is joined by means of a universal joint 64 to a drive shaft 65. This is possible because of the arched rear axle. The wheels are in fact mounted on stub axles. A gear box 66 is mounted centrally of the tractor and on the stationary frame member 16 as shown in Figure 5. A rearwardly extending stub shaft 67 joins the drive shaft 65 through a universal joint 68. The forward end of the stub shaft 67 has fastened thereto a bevel gear 69 within the housing 66. A second bevel gear 70 is in cooperative engagement with the gear 69 and is fastened to a shaft 71 which projects laterally and extends through the tubular frame member 24. A gear box 72 is bolted or otherwise fastened at 72a on the outer end of the tube 24 and the frame member 30. Bevel gears 73 and 74 are journaled within the gear box 72 and are adapted to transmit rotation of the shaft 71 at right angles thereto to the forwardly projecting stub shaft 75. A universal joint 76 joins the stub shaft 75 with a drive shaft 77 projecting forwardly and downwardly through the push bar tube 43. It will be noted in Figure 4 that the universal joint 76 lies on the axis passing through the hinge members 36 and 37 and it is obvious that hinge movement of the secondary frame structure with respect to the stationary frame structure will not affect the continued drive of the drive shaft 77.

The forward lower end of the drive shaft 77 forms a part of a universal joint 78. This universal joint joins the drive shaft 77 with a shaft 79 extending forwardly and on which is fastened the fly-wheel hub 57a. The universal joint 78 is in axial alinement with a vertical hinge 49 about which the mower may swing rearwardly. The swinging of the mower rearwardly is caused only by the striking of an obstruction and the overcoming of a yieldable latch 80. The particular positioning of the universal joint 78 in axial alinement with the hinge 49 permits this rearward swinging of the mower without effecting continued drive of the fly-wheel 57 and hence the reciprocation of the knife blade 54.

A hinge 81 is in axial alinement with the fly-wheel shaft 79 and comprises an arm 31a fixed to the inner shoe 51 and an arm 50a fixed to the outer shoe 50. The hinge 81 and the shaft 79 form a hinge for vertical movement of the cutter bar 52 and inner shoe 51 with respect to the outer shoe 50. The vertical movement of the cutter bar about this hinge is effected by means of a cable 82 which is anchored at 83 adjacent the inner shoe 51. A pulley 84 is rotatable in a bail 85 which is mounted on a bracket 86, in turn mounted on top of the outer shoe 50 by means of bolts, or the like, 87. The rear end of the cable 82 is fastened to a hand lever 88 at 89, and it will be apparent that movement of the lever 88 in a rearward direction about its pivot 90 will effect a vertical raising of the cutter bar about the hinge 81 and the shaft 79. The notched quadrant 91 is mounted on the brace 31 adjacent the hand lever 88 and, by means of a reciprocable detent 92, the lever 88 is maintained in any position desired. The detent 92 is movable in and out of position with respect to the notches in the quadrant 91 by means of a hand pressure lever 93 which raises and lowers a connecting rod 94. The cutter bar is raised to a vertical position when it is desired to transport the tractor without using the mower.

A caster wheel 95 is rotatable within a bail member 96, the upper shank portion 96a of which is journaled for rotation in a cylindrical bearing member 97. Parallel links 98 and 99 are journally mounted on the lower and upper portions 98a and 99a respectively of the cylindrical bearing 97 and extend rearwardly to the place where their ends 100 and 101, respectively, are journaled in depending lugs 102 and 103 from the tubular push member 43. This structure is probably best shown in Figure 2 of the drawings. The lower parallel link 98 has welded thereto an upwardly extending bracket plate 104. The upper end of this bracket plate 104 supports a pivotable threaded block or nut 105 which is adapted to receive a threaded shaft 106. The shaft 106 is journaled within a block 107 which is pivoted by a cross pin 107a within a U-shaped bracket 108 welded as at 108a or otherwise fastened to the push tube 43. The block 107 is held in position by retaining pins 107b. A rearward extension of the threaded shaft 106 forms part of a universal joint 109 and thereupon joins an elongated shaft 110, the end of which is journaled in an upwardly extending supporting frame 111 at 112 and thereupon forms a crank 113, the rotation of which causes rotation of the threaded shaft 106 and movement into or out of the pivotable block nut 105 on the parellel arm bracket 104. It is apparent that rotation of the crank 113 will cause a raising or lowering of the caster-wheel 95, depending upon the direction of rotation of the crank. A downward movement of the caster-wheel 95 will effect an upward movement of the mower and the secondary frame structure about the hinge pins 36 and 37, whereas an upward movement of the caster-wheel 95 will effect a lowering of the mower about these same hinge pins. It is now evident, therefore, that the desired height of mower cutting may be effected by merely raising and lowering of the caster-wheel 95 by means of rotation of the crank 113 which is positioned adjacent the operator's seat 114 of the tractor 10. In order to more easily raise the mower structure about the hinges 36 and 37, a helping spring 115 is positioned intermediate a bracket 116 on the end of the laterally extending tube 24 and a downwardly depending bracket 117 welded at 117a or otherwise attached to the upper parallel arm 99. The spring 115 tends always to force the caster-wheel 95 downwardly and it will be readily understood that ease of rotation of the crank 113 to force the casterwheel 95 downwardly will be materially increased by the assistance of the spring 115. The frame member 111 is attached to the plate member 18a which also holds the members 18 and 30 and as previously stated is bolted to the tractor body by bolts 19.

When the mower swings rearwardly about the vertical hinge 49, the releasable latch 80 must open due to the application of a predetermined amount of force applied thereto. As best shown in Fig. 3, this latch 80 comprises telescopic bar members 118 and 119. The bar 118 is anchored to the push tube 43 by means of the upstanding pin 118a extending through the aperture 120 in the bar 118. A rectangular strap 121 is fastened to the end of bar 119 and is looped over the top of the bar 118, permitting sliding movement therethrough. As shown in Figure 3, the latch has been released and extended its maximum amount. The outer end of the bar 118 is equipped with a raised or humped portion 122 which limits the amount of extension between the telescopic members 118 and 119. A latch member 123 is fastened on top of the bar 119 by means of a bolt 124. A spring 125 is positioned intermediate a nut 126 on the bolt 124 and the surface of the latch member 123. It will be evident that the latch member 123 may be raised from the bar 119 upon compression of the spring 125. The latch member 123 has a raised hook-like end portion 127 which is adapted to engage the hump 122 of the bar 118. The closed position of the latch 80 is shown in Figures 2 and 4. U-shaped guides 128 and 129 are fastened to the underside of the bar 119 with the leg portions extending upwardly so that the telescoping bars 118 and 119 and the latch member 123 are properly guided. The dotted line position of the mower in Figure 4 is an indication of the position of the cutter bar and associated elements after the latch 80 has released, as shown in Figure 3. The outer end of the latch member 123 is attached to an arm 130 at 131. The forward end of the arm 130 is fixed at 132 on the outer shoe 50. The entire mower is permitted to swing about the hinge 49, upon sufficiently compressing the spring 125 by a tendency of the hook portion 127 of the latch to ride up and over the inclined hump 122 of the bar 118. If the cutter bar 52 strikes an obstruction, there is a tendency for the cutter bar and shoe portions of the mower to swing rearwardly about the hinge 49. The latch 80 prevents such rearward swinging until such time as the obstruction has exerted sufficient force on the arm 130 as to pull the hook part 127 over the hump 122 and thereupon permit the telescopic member 118 and 119 to separate. The mower cutter bar will then assume the position shown in the dotted lines in Figure 4. It will be apparent that the limiting position of the cutter bar is set to prevent the cutter bar from striking the steerable wheels 14 of the tractor. When the mower is released for rearward swinging, it then behooves the operator to stop the tractor as quickly as possible so as to prevent breaking of any of the mower elements. The latch 80 may be reset by pulling the cutter bar forward and the mower is then ready to again begin operation.

It will be apparent from the foregoing description that a new and novel front mounted tractor mower construction has been provided. The intention is to limit the invention only within the scope of the appended claims.

What is claimed is:

1. In a tractor-mounted mower comprising a tractor having a laterally extending horizontal stationary frame member, a mower having a horizontally positioned frame member, hinge means hingedly joining the mower frame member to the tractor stationary frame member, a push bar member attached to said horizontally positioned mower frame member and extending forwardly and downwardly, said mower having a second frame structure, and hinge means for hingedly connecting said mower frame structure with said push bar.

2. In a tractor-mounted mower comprising a tractor having a laterally extending horizontal stationary frame member, a mower having a horizontally positioned frame member, hinge means hingedly joining the mower frame member to the tractor stationary frame member, a push-bar member attached to said horizontally positioned mower frame member and extending forwardly and downwardly, said mower having a second frame structure, hinge means for hingedly connecting said mower frame structure with said push bar, a power take-off on said tractor, mower operating mechanism, drive-shaft means for connecting the tractor power take-off to the mower operating mechanism, and universal joints in said drive shaft means in axial alinement with each of the hinge means whereby mower operation is uninterrupted when hinging occurs.

3. In a tractor-mounted mower comprising a tractor having a laterally extending horizontal stationary frame member, a mower having a horizontally positioned frame member, hinge means hingedly joining the mower frame member to the tractor stationary frame member, a push-bar member attached to said horizontally positioned mower frame member and extending forwardly and downwardly, said mower having a frame structure at the forward end of said push-bar member, and hinge means for hingedly connecting said mower frame structure with said push bar, said mower having a laterally extending cutter bar hinged to said mower frame structure for vertical movement of the cutter bar.

4. In a tractor-mounted mower comprising a tractor having a laterally extending horizontal stationary frame member, a mower having a horizontally positioned frame member, hinge means hingedly joining the mower frame member to the tractor stationary frame member, a push-bar member attached to said horizontally positioned mower frame member and extending forwardly and downwardly, said mower having a frame structure at the forward end of said push-bar member, hinge means for hingedly connecting said mower frame structure with said push bar, said mower having a laterally extending cutter bar hinged to said mower frame structure for vertical movement of the cutter-bar, a knife blade on said cutter bar, and means for reciprocating said knife blade including a crank and a pitman, said crank being in axial alinement with the hinge on the cutter bar, whereby the cutter bar may be raised about the hinge and crank without interrupting knife blade drive.

5. In a tractor-mounted mower comprising a tractor having a laterally extending horizontal stationary frame member, a mower having a horizontally positioned frame member, hinge means hingedly joining the mower frame member to the tractor stationary frame member, a push-bar member attached to said horizontally positioned mower frame member and extending forwardly and downwardly, said mower having a frame structure at the forward end of said push-bar member, hinge means for hingedly connecting said mower frame structure with said push bar, said mower having a laterally extending cutter bar hinged to said mower frame structure for vertical movement of the cutter bar, a knife blade on said cutter bar, means for reciprocating said knife blade including a crank and a pitman, said crank being in axial alinement with the hinge on the cutter bar, a power take-off on the tractor, and drive shaft means extending from the tractor power take-off to the crank.

6. In a tractor-mounted mower comprising a tractor having a laterally extending horizontal stationary frame member, a mower having a horizontally positioned frame member, hinge means hingedly joining the mower frame member to the tractor stationary frame member, a push-bar member attached to said horizontally positioned mower frame member and extending forwardly and downwardly, said mower having a ground-engaging shoe structure, hinge means for hingedly connecting said shoe structure with said push bar, said mower having a laterally extending cutter bar hinged to said shoe structure for vertical movement of the cutter bar, a knife blade on said cutter bar, means for reciprocating said knife blade including a crank and a pitman, said crank being in axial alinement with the hinge on the cutter bar, a power take-off on the tractor, drive shaft means extending from the tractor power take-off to the crank, and universal joints in said drive shaft means in axial alinement with each of the first two hinge means, whereby knife blade reciprocation is uninterrupted upon hinging movement around any of the three-named hinges.

7. In a tractor mower, a stationary frame structure extending laterally outwardly solely from one side of the tractor, a vertically swinging and forwardly extending mower frame structure hinged to said laterally extending frame structure, a second mower frame structure hinged to the forward end of said first mower frame for horizontal swinging movement, and a cutter bar hinged for vertical movement to said second frame structure and extending in a lateral direction opposite to the laterally extending frame structure.

8. In a tractor mower, a stationary frame structure extending laterally outwardly from one side of the tractor, a vertically swinging and forwardly extending mower frame structure hinged to said laterally extending frame structure, a second mower frame structure hinged to the forward end of said first mower frame for horizontal swinging movement, a cutter bar hinged for vertical movement to said second frame structure and extending in a lateral direction opposite to the laterally extending frame structure, and means for effecting swinging movement of the mower elements about their respective hinges.

9. In a tractor mower having a cutter bar in front of the tractor, a push bar extending forwardly from one side of the tractor and having the cutter bar extending laterally from the end thereof, a caster wheel mounted by parallel links for vertical movement with respect to the push bar, means for adjustably positioning said caster wheel with respect to the push bar, said means comprising a threaded block associated with one of said parallel links, a fixed journal on said push bar, and a threaded shaft engaging said block and passing through said journal for rotation but not axial movement, whereby upon rotation of said shaft the block and the parallel link are optionally moved to and from said fixed journal.

10. In a tractor mower having a cutter bar in front of the tractor, a push bar extending forwardly from one side of the tractor and having the cutter bar extending laterally from the end thereof, a caster wheel mounted by parallel links for vertical movement with respect to the push bar, means for adjustably positioning said caster wheel with respect to the push bar, said means comprising a threaded block associated with one of said parallel links, a fixed journal on said push bar, and a threaded shaft engaging said block and passing through said journal for rotation but no axial movement, whereupon upon rotation of said shaft the block and the parallel link are optionally moved to and from said fixed journal, and a spring normally acting to force the other of said parallel links downwardly.

11. In a tractor mower having a cutter bar in front of the tractor, a push bar extending forwardly from one side of the tractor and having the cutter bar extending laterally from the end thereof, a caster wheel mounted by parallel links for vertical movement with respect to the push bar, means for adjustably positioning said caster wheel with respect to the push bar, said means comprising an internally threaded block associated with one of said parallel links, a fixed journal on said push bar, and a threaded shaft engaging said block and passing through said journal for rotation but no axial movement, whereby upon rotation of said shaft the block and the parallel link are optionally moved to and from said fixed journal, and yieldable means acting to force the parallel links downwardly.

SAMUEL E. HILBLOM.

REFERENCES CITED

The following references are of record in the file of this patent:

UNITED STATES PATENTS

| Number | Name | Date |
| --- | --- | --- |
| 1,533,359 | White | Apr. 14, 1925 |
| 2,120,671 | Jensen et al. | June 14, 1938 |
| 2,136,834 | Baird | Nov. 15, 1938 |
| 2,143,473 | Brown | Jan. 10, 1939 |
| 2,150,350 | Vargas | Mar. 14, 1939 |
| 2,314,216 | Hilblom | Mar. 16, 1943 |
| 2,318,202 | Colvin et al. | May 4, 1943 |
| 2,340,488 | Paradise et al. | Feb. 1, 1944 |